J. J. WILLENBORG.
VENTILATED FRUIT AND VEGETABLE CASE.
APPLICATION FILED FEB. 1, 1921.
1,407,107.
Patented Feb. 21, 1922.
2 SHEETS—SHEET 1.
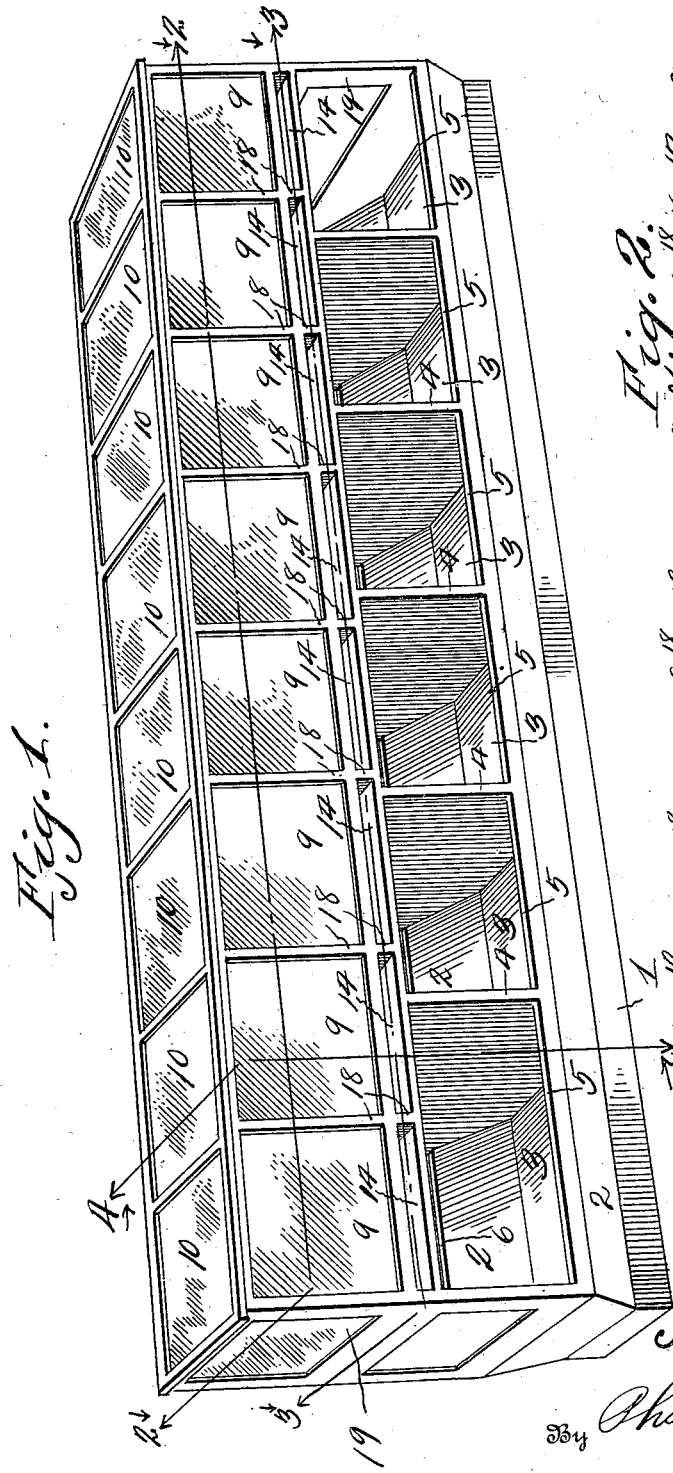
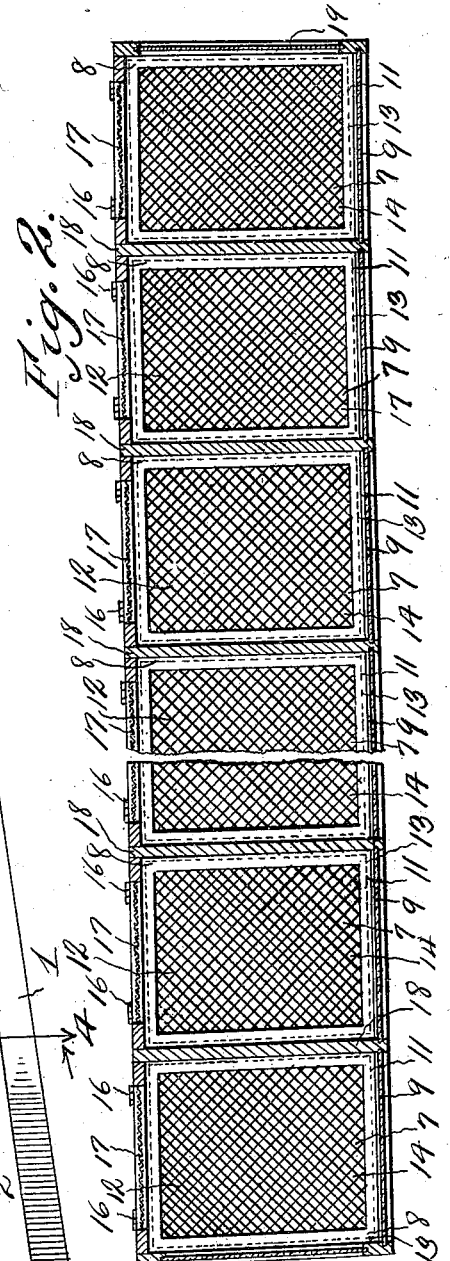
Inventor
J. J. Willenborg
By Philip A. H. Ferrell
his Attorney

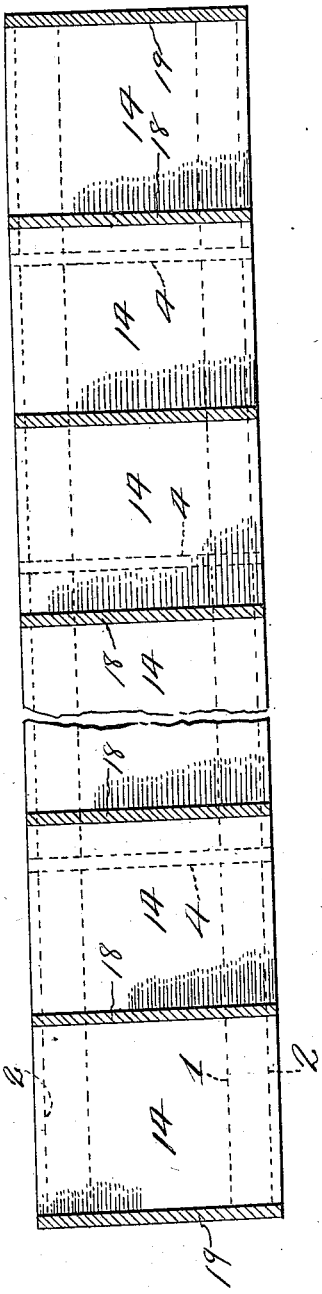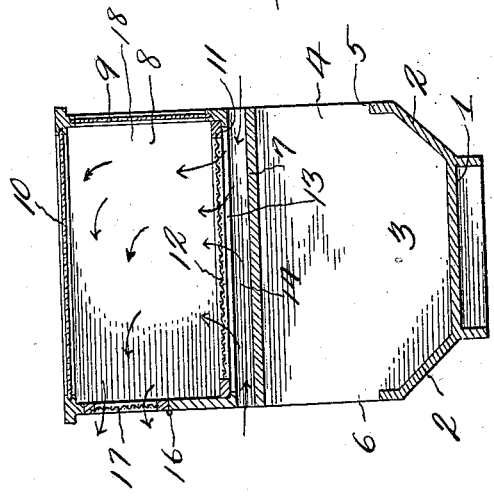

UNITED STATES PATENT OFFICE.

JOHN JOSEPH WILLENBORG, OF PAWNEE, ILLINOIS.

VENTILATED FRUIT AND VEGETABLE CASE.

1,407,107.

Specification of Letters Patent.   Patented Feb. 21, 1922.

Application filed February 1, 1921.   Serial No. 441,621.

*To all whom it may concern:*

Be it known that I, JOHN JOSEPH WILLENBORG, a citizen of the United States, residing at Pawnee, in the county of Sangamon and State of Illinois, have invented certain new and useful Improvements in Ventilated Fruit and Vegetable Cases, of which the following, is a specification, reference being had therein to the accompanying drawing.

The invention relates to fruit and vegetable cases, and has for its object to provide a case of this character, wherein various fruits may be displayed under glass, thereby obviating handling of the fruit by purchasers and damage of the fruit incident to constant handling, and at the same time provide ventilating means, whereby a circulation of air may pass through the fruit compartment, thereby obviating sweating of the fruit, which is a common difficulty at present found in displaying fruit under glass.

A further object is to provide a combined fruit and vegetable display case comprising transversely disposed vegetable bins adjacent the lower end of the case and transversely disposed fruit bins superimposed on the vegetable bins, said fruit bins having their upper and front sides enclosed in glass and their lower and rear sides provided with wire mesh through which air may pass for ventilating the fruit. The air passes through the wire mesh from transversely disposed air passages disposed between the vegetable and fruit bins. A further object is to provide means whereby the wire mesh forming the bottoms of the fruit bins may be easily removed for cleaning purposes and for allowing easy access to the transversely disposed air passages, whereby said passages may be thoroughly cleaned.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a perspective view of the combined vegetable and fruit case.

Figure 2 is a horizontal sectional view taken on line 2—2 of Figure 1.

Figure 3 is a horizontal sectional view taken on line 3—3 of Figure 1.

Figure 4 is a vertical transverse sectional view taken on line 4—4 of Figure 1.

Referring to the drawings, the numeral 1 designates a base, the front and rear sides of which have upwardly and outwardly extending walls 2, thereby forming vegetable bins 3, in which bins which are preferably formed of different lengths by partitions 4, various kinds of vegetables may be disposed. The front and rear sides of the bins 3 are open as at 5 and 6 so that the vegetables may be removed from either side of the case. Connecting the upper end of the partitions 4 is a horizontally disposed partition 7 forming a top for the bins 3. Superimposed in relation to the bins 3 are fruit bins 8, in which bins various kinds of fruit is placed, said bins 8 having their front sides formed from glass 9 and their tops 10 also formed from glass, through which glass the fruit may be observed by the purchaser, but cannot be handled by the purchaser, thereby obviating unsanitary conditions, and at the same time obviating decay of the fruit incident to it being bruised from constant handling and throwing back into the bins, which is the common difficulty at present experienced.

It has been found that where fruit is displayed under glass that it is necessary, to the proper preservation of the same, and to prevent the same from sweating, that a circuit of air be maintained through the fruit. To accomplish this result, the lower ends of the fruit bins 8 are open as at 11 and are provided with removable wire mesh bottoms 12. The removable wire mesh bottoms 12 being supported on flanges 13 and are spaced from the upper sides of the horizontal partition 7 thereby forming transversely disposed air passages 14, which extend entirely through the case. The rear side 15 of the fruit bins 8 at a point spaced from the lower ends thereof has hingedly connected thereto as at 16, screened horizontally hinged doors 17, and through which doors, air, which passes inwardly through the ends of the air passages 14 and upwardly through the screened bottoms 12 may pass from the bins 8, said circuit of air preventing sweating and deterioration of the fruit. By positioning the screened doors 17 spaced from the bottoms of the bins 8, it will be seen that a thorough circulation of the air through the bins will be maintained, and by forming the screened doors 17 smaller than the screened bottoms of the bins 8, that a choking action takes place, which will equally distribute the current of air throughout each bin. Bins 8 are formed by spaced vertical disposed walls 18 rising upwardly from the horizontally disposed partition 7 and the end glass walls 19, carried by the end bins. By providing these partitions which also divide the air passages from each other, it will be seen that odors of the fruit within one bin will not comingle with odors of fruits in adjacent bins, therefore the most delicate fruit and articles may be displayed in the bins without having their odors or the articles injured by odors from adjacent bins.

From the above it will be seen that a ventilated fruit and vegetable display case is provided wherein the vegetables will be positioned adjacent the flooring and the fruit displayed under glass remote from the flooring and ventilated through horizontally disposed air passages spaced from the flooring, thereby obviating the possibility of dust and dirt being carried through the air passages to the fruit, which would be the case if the air passages where located adjacent the bottom of the display case.

The invention having been set forth what is claimed as new and useful is:—

A ventilated display case, said case comprising horizontally disposed compartments, said compartments having glass top and front walls being disposed remote from the lower end of the casing as a whole, the bottoms of said compartments being provided with screening, doors carried at the side of the compartments and formed from screening, and horizontally disposed air passages disposed beneath the screened bottoms of the compartments and remote from the lower end of the casing as a whole, thereby obviating entrance of dirt or dust to the air passages, said air passages being substantially of the same horizontal cross sectional area as the horizontal cross sectional area of the compartments and registering with said compartments.

In testimony whereof I hereunto affix my signature.

JOHN JOSEPH WILLENBORG.